United States Patent [19]
Dyer et al.

[11] 3,911,945
[45] Oct. 14, 1975

[54] ADJUSTABLE CONSTANT VOLUME VALVE

[75] Inventors: John D. Dyer; Roger A. Smith, both of Tucson, Ariz.

[73] Assignee: Lear Siegler, Inc., Krueger Division, Tucson, Ariz.

[22] Filed: Aug. 5, 1974

[21] Appl. No.: 494,382

[52] U.S. Cl................................. 137/499; 138/46
[51] Int. Cl.².......................................... G05D 7/01
[58] Field of Search ............ 137/499, 521, 625, 38; 138/43, 45, 46; 267/173

[56] References Cited
UNITED STATES PATENTS

| | | | |
|---|---|---|---|
| 571,658 | 11/1896 | Graves................................ | 137/499 |
| 843,959 | 2/1907 | McBride............................. | 137/499 |
| 3,452,762 | 7/1969 | Fahre.................................. | 137/499 |
| 3,538,945 | 11/1970 | Dean, Jr. ............................ | 137/499 |

Primary Examiner—Martin P. Schwadron
Assistant Examiner—Robert J. Miller
Attorney, Agent, or Firm—Cahill, Sutton & Thomas

[57] ABSTRACT

A fluid valve is described incorporating a pair of pivoted vanes, the first of which is mounted for pivotal movement into a fluid stream within a passageway or conduit through said valve to reduce the flow of fluid past the vane. The second vane, while attached to the first vane, extends from the first vane and is positioned immediately upstream from a shroud forming a wall of the valve; the shroud restricts fluid flow around the second vane, thus forcing the second vane to be subjected to essentially the total pressure of the fluid in the conduit. The force exerted by the total pressure on the second vane is imparted to the first vane, causing the latter to extend into the fluid stream and reduce the volume rate of flow of the fluid past the valve. A biasing spring is connected to the vanes, urging the first vane to rotate out of the flow of fluid within the passageway. The biasing spring may be calibrated to balance the force exerted by the second vane on the first vane to render the valve self-adjusting over a wide range of total pressures of thereby deliver a substantially constant volume rate of flow of fluid. A movable wall is positioned in the valve opposite said first vane; the positioning of the wall providing a means for selecting the volume rate of flow which the valve is to provide.

4 Claims, 8 Drawing Figures

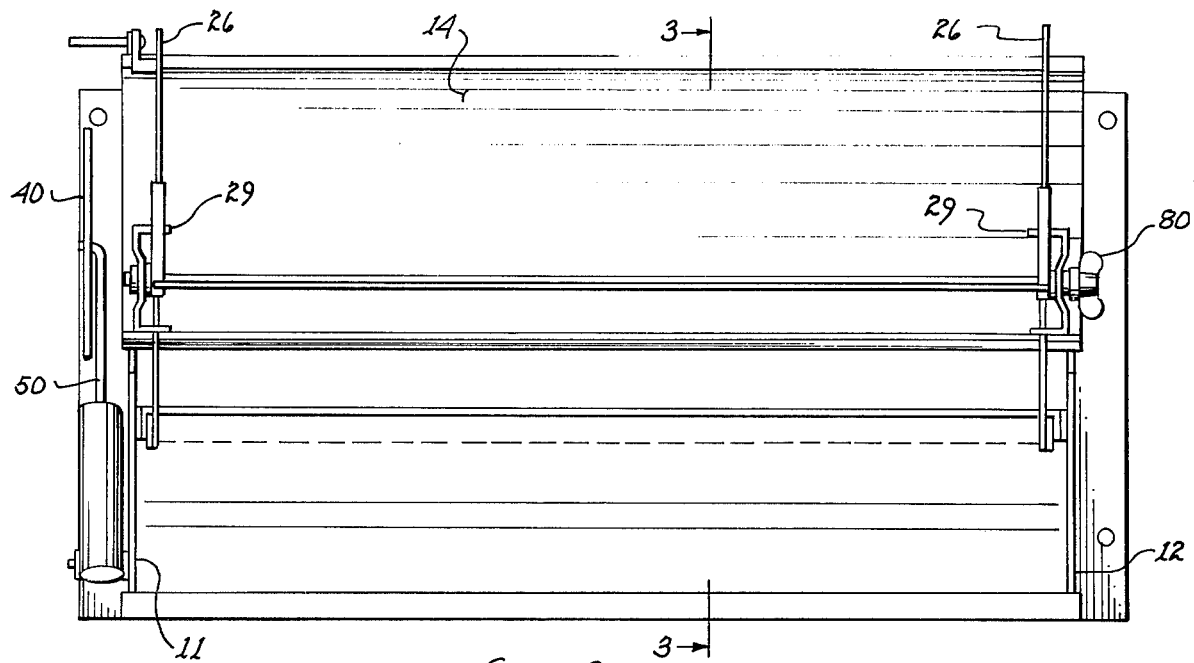
fig. 2
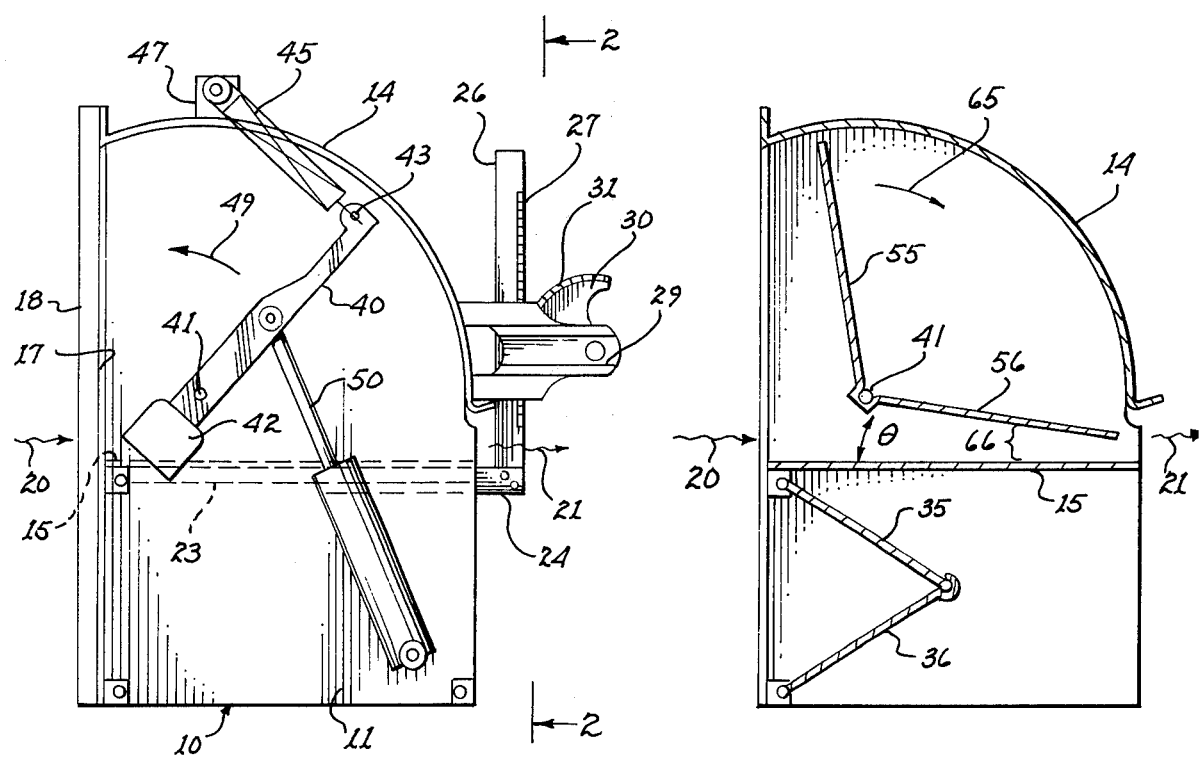
fig. 1
fig. 3

ADJUSTABLE CONSTANT VOLUME VALVE

The present invention pertains to fluid valves, and more particularly, to valves of the constant volume type wherein the valve may be adjusted to control the flow rate through the valve to a relatively constant value over a given range of system pressures.

In many fluid flow applications, such as in the control of conditioned air, it is desirable to utilize a valve for automatically controlling the rate of flow to a predetermined value. Such valves are characteristically referred to as constant volume valves and are insertable in the ductwork or fluid conduits of an air conditioning system. Prior art constant volume valves incorporate varying degrees of complexity and bulk in an attempt to maintain the flow rate therethrough at a reasonably constant level for a specified range of conditioning system pressure. The valves characteristically incorporate several moving elements which induce friction loss and thereby render the valves less sensitive; the lack of sensitivity resulting from the numerous moving parts restricts the pressure range through which the constant volume valve operates.

Attempts have been made to utilize self-regulating valves of the type utilizing a "sail" such as shown in U.S. Pat. No. 3,538,945; other prior art systems have used positionable vanes in ductwork such as shown in U.S. Pat. Nos. 2,933,100 and 3,452,762. The U.S. Pat. to Graves, No. 571,658, attempts to use two vanes positioned at right angles to each other to obtain a controlling force from one vane to position the other; unfortunately, the latter system is not adjustable and cannot be made to operate over commercially acceptable ranges of pressure and flow rate. With other such prior art systems, with a given pressure in the air conditioning system, the range of flow rates that can successfully be controlled is frequently unduly limited.

It is therefore an object of the present invention to provide a constant volume valve operable over a wide range of system pressure and flow rates.

It is another object of the present invention to provide a constant volume valve with few moving parts and therefore few points of friction that would otherwise reduce the sensitivity of the valve and limit the pressure range and flow rate over which the valve operates.

It is still another object of the present invention to provide a constant volume valve whose flow rate may be quickly and conveniently selected without disassembly.

It is a further object of the present invention to provide an adjustable constant volume valve with few moving parts and with low noise generating construction.

These and other objects of the present invention will become apparent to those skilled in the art as the description thereof proceeds. The present invention may be described by reference to the accompanying drawings in which:

FIG. 1 is a side elevational view, partially broken away, of a valve constructed in accordance with the teachings of the present invention.

FIG. 2 is a front elevational view showing the exit side of the valve of FIG. 1.

FIG. 3 is a cross-sectional view of the valve of FIG. 2 taken along lines 3—3.

Figure 4:
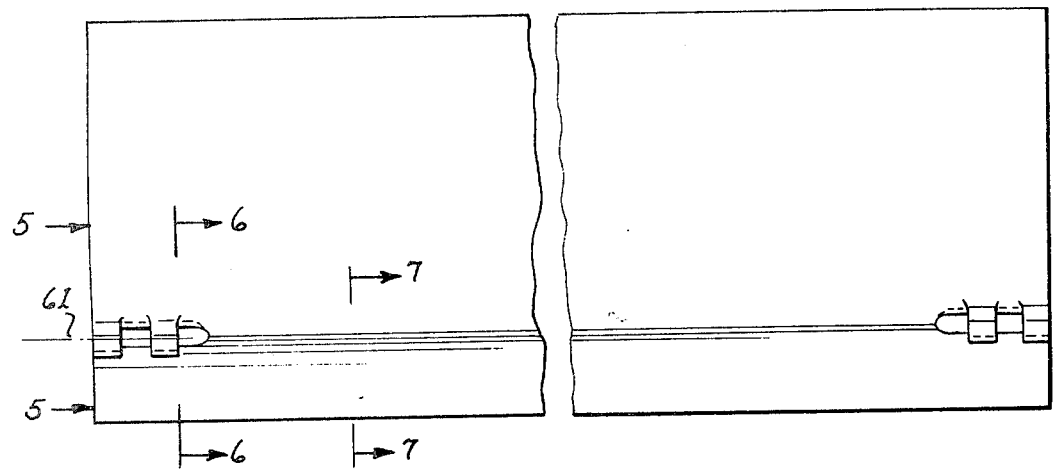
FIG. 4 is an elevational view of the vanes used in the valve of the present invention.

Referring now to the drawings, the valve 10 is shown having side panels 11 and 12 separated by an arcuately curved upper wall or shroud 14 and a movable bottom wall 15. The input side of the valve includes a flange 17 to which may be secured a suitable gasket 18 to facilitate sealing the valve against a corresponding opening in a supply conduit. The valve 10 may be positioned entirely within a conduit, positioned at the end of a conduit to provide air to another conduit or air conditioned space, or may be placed in other apparatus as an integral part thereof such as a mixing box. Air, the volume rate of flow (or flow rate) of which is to be controlled, enters the input side of the valve as indicated by the arrow 20 and exits as indicated by the arrow 21.

The movable bottom wall 15 is supported on a suitable frame 23 to which is connected a supporting bar 24. The supporting bar in turn is riveted or otherwise secured to an adjusting strap or bar 26 which is formed into a rack having teeth 27.

A bracket 29 is secured to the shroud 14 and rotatably supports a pinion 30 having teeth 31 therein meshing with the teeth 27. It may therefore be seen that rotation of the pinion results in the vertical movement of the supporting bar 24 and the bottom wall 15.

Plates 35 and 36 are hinged at the upstream edge of the movable bottom 15 and at the bottom edge of the valve, respectively, and are also hinged together as shown. In this manner, as the bottom wall 15 is raised or lowered, the plates 35 or 36 expand or collapse in accordian fashion to subsequently block the passage of air beneath the bottom wall 15. To facilitate air blockage each of the plates 35 and 36 may be provided with a thin flexible seal (not shown) that would have wiping contact with the sides 11 and 12 of the valve.

A control arm 40, the purposes of which will be explained more fully hereinafter, is pivotally mounted on a pivot pin 41 extending through the side 11 of the valve; the arm 40 includes a counter-balance 42 to eliminate the effect of the weight of the control arm and blades on the operation of the valve. The control arm 40 is provided with a hole 43 at one end thereof to receive one end of a biasing spring 45; the other end of the biasing spring 45 is secured to a mounting tab 47 attached to the top of the valve. It may be seen that the biasing forces exerted by the spring 45 would normally urge the control arm 40 about the pivot pin 41 in the direction indicated by the arrow 49. To dampen any oscillations that the valve may generate, a conventional piston/cylinder damper or dash pot 50 is pivotally connected to the control arm 40 and to the side 11 of the valve.

Figure 5:
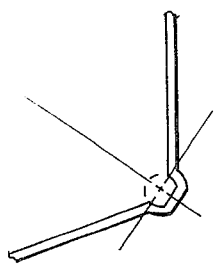
FIG. 5 is a cross-sectional view, enlarged, of a portion of FIG. 4 taken along lines 5—5.
Figure 6:
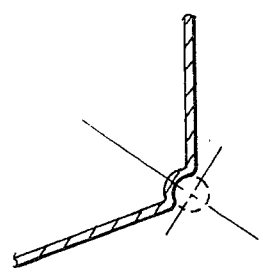
FIG. 6 is a cross-sectional view, enlarged, of a portion of FIG. 4 taken along lines 6—6.
Figure 7:
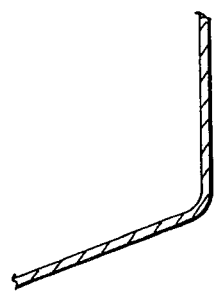
FIG. 7 is a cross-sectional view, enlarged, of a portion of FIG. 4 taken along lines 7—7.

Within the valve, vanes 55 and 56 are mounted for rotation with the pins 41. It will be obvious to those skilled in the art that various mounting arrangements may be used for the vanes 55 and 56 and that different schemes may be used for pivotally mounting the vanes. In the embodiment chosen for illustration, a pin and vane arrangement is shown in FIGS. 4–7 where it may be seen that the vanes are formed from a single sheet of metal 60 appropriately stamped or bent to form an angle of approximately 103° between the resulting vanes. At the axis 61 of the bend, the metal is punched in alternate directions as shown in FIGS. 5, 6 and 7 so that the resulting structure will accept a pivot pin (not shown) which will be held by and gripped by the vanes. In this manner, the total friction caused by the pivoting of the vanes 55 and 56 will only be the friction of the pins rotating or pivoting within openings provided for the pins in the sides 11 and 12 of the valve 10.

Since the vane 55 must pivot about the pivot pins 41 and since it is positioned with the tip thereof in close proximity to the shroud 14, the vane 55 will be subjected to the total pressure of the air as it enters the valve inlet regardless of the angular position of the vane 55.

A force is thus derived from the pressure of the air acting upon the vane 55, said force tending to rotate the vane 55 about the pivot pin 41 in the direction indicated by the arrow 65. Under given stable operating conditions, the force derived by the action of the total pressure on the vane 55 is countered by the force of the biasing spring 45 connected to the control arm 40 (tending to rotate vanes 55 and 56 in the direction indicated by the arrow 49) and by the forces exerted by the air as it passes through the throat 66 of the valve formed by the movable bottom 15 and the vane 56.

Figure 8:
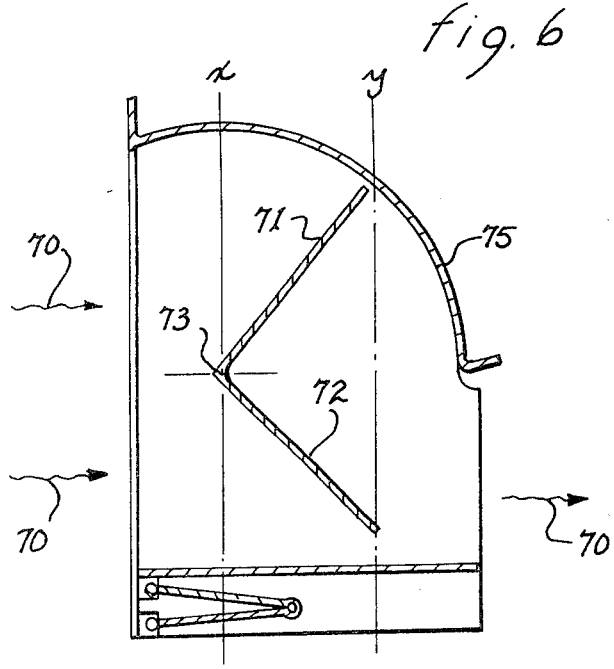
FIG. 8 is a simplified schematic diagram useful in describing the operation of the present invention.

The operation of the valve 10 may be explained with the assistance of FIG. 8. Referring to FIG. 8, it will be assumed that fluid flow is in the direction of the arrow 70 and that vanes 71 and 72 are free to rotate about the pivot pin 73 subject to a biasing force supplied by a biasing spring (not shown in FIG. 8). The biasing force is applied to the vanes 71 and 72 to urge the vane 72 to pivot counterclockwise about the pin 73 (and thus extend substantially parallel to the direction of air flow) and present minimum resistance to the passage of air through the valve. The total pressure existing in the air stream upstream of the vanes 71 and 72, when the vane 72 is horizontal, exerts a force on the vane 71 tending to rotate both vanes clockwise about the pin 73. The balancing of the clockwise and counterclockwise forces may best be described by examining the pressure exerted by the fluid stream at planes X and Y extending perpendicularly through the valve. Examining the effect of this pressure on the vane 72, it may be noted that the total pressure at the plane X, $P_T(x)$ is the same as the total pressure at the plane Y, $P_T(y)$ (disregarding for the moment the friction losses). However, it is known that any forces exerted on the vane 72 by the fluid must be perpendicular to the surface of the vane 72; it is also known that the total pressure $P_T$ is equal to the sum of the static pressure $P_S$ and the velocity pressure $P_V$. Therefore, as to the vane 72

$P_T(x) = P_S(x) + P_V(x)$
$P_T(y) = P_S(y) + P_V(y)$
since $P_T(x) = P_T(y)$
then $P_S(x) + P_V(x) = P_S(y) + P_V(y)$ or stated differently, as the velocity pressure from plane X to plane Y increases, the static pressure from plane X to plane Y decreases. Since we have already stated that forces acting on the vane 72 must be perpendicular thereto, we know that the static pressure and not the velocity pressure acts perpendicular to the vane 72. Therefore, the force acting upon the vane 72 tending to cause it to rotate counter clockwise about the pin 73 is proportional to the average static pressure exerted on the vane 72 by the fluid.

With respect to the vane 71, it may be noted that the top arcuate wall 75 restricts the fluid from flowing around the vane 71 and therefore effectively reduces the velocity pressure acting upon the vane to zero. Under these circumstances, the total pressure at the vane 71 is provided entirely by static pressure and this static pressure therefore remains essentially the same for any position of the vane 71 and for any given total pressure. If both vanes 71 and 72 have the same area exposed to the air stream, the force acting on the vane 71 will also be greater than the force acting on the vane 72. The biasing means, such as the spring 45 in FIG. 1, may therefore be calibrated to add a force tending to rotate or pivot the vane 72 in a counterclockwise direction to overcome the imbalance of forces acting on the vanes 71 and 72 by the air stream. For any given biasing force or biasing spring calibration, the total pressure of the air stream may vary over a predetermined range of values to permit a given flow rate to exit from the valve; variations of the total pressure within that range will result in the pivoting of the vanes 71 and 72 clockwise or counterclockwise to maintain the volume rate of flow or flow rate through the valve essentially constant.

The above simplified description does not account for the fact that, in practical applications of the valve, the actual useful range of total pressures for which the valve will successfully operate, may be quite limited; this latter deficiency is particularly true when low total pressures are encountered. Under the latter circumstance, the vanes will have a tendency to rotate to a completely open position and fail to regulate the flow rate. Similarly, at high total pressures the valve sometimes will have a tendency to close completely and therefore also fail to regulate the flow rate. Another significant difficulty occurs when low flow rates are required and the controlling vane (such as the vane 72 in FIG. 8 or the vane 56 in FIG. 3) forms a large angle relative to the bottom of the valve (angle θ FIG. 3). When this angle becomes great, substantial noise is generated (particularly at the low flow rates and higher pressures) which renders the valve unacceptable for modern applications. Unfortunately, to properly regulate the flow rate, the angle increases as the flow rate decreases if the entering orifice area remains constant.

The valve of the present invention incorporates a movable bottom 15 which permits selection of flow rates for a wide range of expected total pressures to be found in the systems with which the valve is to be used. For example, positioning the movable bottom 15 to a position shown in FIGS. 1-3, permits low flow rates while maintaining the θ at a relatively low valve; this "restructuring" of the valve through the adjustment of the positioning of the movable bottom 15 significantly reduces the noise generated by the air passage through the throat area 66 and also generally increases the frequency of such noise. It is well known that higher frequencies in conditioned air systems are easier to dampen than low frequencies. Another advantage achieved by the movable bottom 15 is the selectivity of the flow rate without changing the biasing spring characteristics. For example at low total pressures, in order to achieve appropriately regulated flow rates, biasing spring forces would have to be changed either by repositioning the spring (and thus changing its moment arm) or by replacing the spring. It may therefore be seen that the movable bottom 15 may be positioned to effectively change the angle θ that the blade 56 will make relative to the bottom and to the air stream flowing through the valve; reducing the angle will obviate the necessity of changing the biasing spring or biasing spring position and will concurrently reduce the amplitude of noise generated by the air flow as well as increase the frequency of the noise (thus rendering the noise more attenuatable).

For example, tests have been conducted at variable flow rates and variable total pressures, both with and without using a movable bottom wall in the valve. A significant reduction in the noise level was found to accompany the use of the bottom wall as a means for reducing the angle between the regulating vein and the bottom wall and air stream. Using noise criteria established by the American Society of Heating, Refrigeration and Airconditioning Engineers (ASHRAE) and specifically the NC curves developed by them using approximate representations of loudness coutours and special interfering properties of noise, noise reductions from three to five NC numbers or from 50% to 66% of the generated power were derived by the use of the movable bottom wall. The tests were conducted at flow rate ranges from 600 – 800 CFM and total pressures of from 1 – 6 inches of water.

The length of the blades 55 and 56 may be equal; however, it has been found that control characteristics are better when the blade 56 is made slightly longer than the blade 55. The movable bottom 15 may be positioned in any convenient manner such as by the rack and pinion arrangement shown in the embodiment chosen for illustration. In practice, the mechanism can be calibrated for desired flow rates and an operator may then simply rotate the pinion to a previously calibrated position for a given flow rate. The pinion may then be locked in position by any convenient means such as by a wing nut 80 (FIG. 2).

While the present embodiment has been described in terms of the vanes 55 and 56 extending at an angle of 103° with respect to each other, other angular relationships may be used although angles of approximately 100° appear to be optimum.

I claim:

1. a fluid valve having a fluid passageway for adjustably controlling the volume rate of flow of a fluid stream flowing through said passageway comprising: a first vane pivotally mounted in said passageway for movement into said fluid stream to reduce the fluid flow passing through said passageway; a second vane connected to said first vane for transmitting force to said first vane to urge the latter into said fluid stream, said second vane positioned to be exposed to the total pressure of said fluid and to derive said force from said total pressure; biasing means urging said first vane out of said fluid stream in opposition to said force; means adjustable extending into said passageway opposite said first vane for effectively increasing or decreasing the cross-sectional area of said passageway at said first vane, said means comprising a bottom wall extending substantially parallel to the direction of fluid flow through said valve.

2. The combination as set forth in claim 1 wherein said bottom wall is connected to a collapsible wall at an upstream portion thereof to prevent fluid from flowing beneath said bottom wall.

3. The combination as set forth in claim 2 including means connected to said bottom wall to raise and lower said wall toward or away from said first vane.

4. The combination as set forth in claim 1 wherein said vanes are formed of a single sheet of metal bent along an axis and having a pair of pivot pins secured at either side thereof on said axis, and wherein said pivot pins are mounted for rotation in walls forming side walls of said valve.

* * * * *